United States Patent
Koukan et al.

(10) Patent No.: US 9,669,706 B2
(45) Date of Patent: Jun. 6, 2017

(54) FILLING DEVICE FOR A MOTOR VEHICLE OPERATING FLUID CONTAINER

(71) Applicant: KAUTEX TEXTRON GMBH & CO., KG, Bonn (DE)

(72) Inventors: Ibrahim Koukan, Cologne (DE); Jaroslav Maglovski, Lohmar (DE)

(73) Assignee: KAUTEX TEXTRON GMBH & CO. KG, Bonn (DE)

(*) Notice: Subject to any disclaimer, the term of this patent is extended or adjusted under 35 U.S.C. 154(b) by 0 days.

(21) Appl. No.: 15/028,686

(22) PCT Filed: Oct. 7, 2014

(86) PCT No.: PCT/EP2014/071412
§ 371 (c)(1),
(2) Date: Apr. 11, 2016

(87) PCT Pub. No.: WO2015/052168
PCT Pub. Date: Apr. 16, 2015

(65) Prior Publication Data
US 2016/0263991 A1 Sep. 15, 2016

(30) Foreign Application Priority Data
Oct. 9, 2013 (DE) .................. 10 2013 016 683

(51) Int. Cl.
*B60K 15/035* (2006.01)
*B60K 15/04* (2006.01)
(Continued)

(52) U.S. Cl.
CPC ...... *B60K 15/03504* (2013.01); *B60K 15/035* (2013.01); *B60K 15/04* (2013.01);
(Continued)

(58) Field of Classification Search
CPC ............ B60K 15/077; B60K 15/03504; B60K 15/035; B60K 15/04; B60K 15/0403;
(Continued)

(56) References Cited

U.S. PATENT DOCUMENTS 4,706,708 A * 11/1987 Fornuto ........... B60K 15/03519
137/588
5,503,199 A * 4/1996 Whitley, II ............ B60K 15/04
141/286

(Continued)

FOREIGN PATENT DOCUMENTS

| JP | 2010000976 A | 1/2010 |
| WO | 2012139613 A1 | 10/2012 |
| WO | 2012139631 A1 | 10/2012 |

OTHER PUBLICATIONS

English language PCT International Search Report mailed Feb. 16, 2015, received in corresponding PCT Application No. PCT/EP14/71412, 2 pgs.

(Continued)

*Primary Examiner* — Timothy L Maust
*Assistant Examiner* — Andrew Schmid
(74) *Attorney, Agent, or Firm* — Grossman, Tucker, Perreault & Pfleger, PLLC

(57) ABSTRACT

The present invention discloses a filling device (1) for a motor vehicle operating fluid container (3). The filling device (1) comprises a mouth hole connection piece (11), into which a dispensing valve (40) can be introduced in order to fill the operating fluid container (3). The filling device (1) further comprises a compensation chamber (24) to which the mouth hole connection piece (11) is connected in fluid terms. A connection piece (21) of the filling device (1) is arranged between the operating fluid container (3) and the compensation chamber (24) and is connected in fluid terms to the operating fluid container (3) and the compen- (Continued)

sation chamber (24). The filling device (1) is distinguished in that the connection piece (21) protrudes into the compensation chamber (24), the connection piece (21) is arranged so as to face the mouth hole connection piece (11) and to be spaced apart therefrom, the connection piece (21) is surrounded by the compensation chamber (24), and a dispensing valve (40) can be introduced through the mouth hole connection piece (11) into the connection piece (21).

7 Claims, 3 Drawing Sheets

(51) Int. Cl.
 *F01N 3/10* (2006.01)
 *F01N 3/20* (2006.01)
 *B60K 15/03* (2006.01)

(52) U.S. Cl.
 CPC ............ *B60K 15/0403* (2013.01); *F01N 3/10* (2013.01); *F01N 3/2066* (2013.01); *B60K 2015/03309* (2013.01); *B60K 2015/03394* (2013.01); *B60K 2015/03538* (2013.01); *B60K 2015/03552* (2013.01); *B60K 2015/0458* (2013.01); *F01N 2610/1406* (2013.01); *F01N 2610/1413* (2013.01); *F01N 2610/1466* (2013.01)

(58) Field of Classification Search
 CPC ........... B60K 2015/03552; B60K 2015/03538; B60K 2015/03309; B60K 2015/0458; B60K 2015/03394
 USPC .... 141/285, 289, 290, 297–300, 311 R, 312, 141/348–352, 356, 363, 367, 369, 370, 141/372, 390; 220/4.14, 746, 86.2, 86.4
 See application file for complete search history.

(56) References Cited

U.S. PATENT DOCUMENTS

2009/0084464 A1* 4/2009 Hagano ................. B60K 15/04 141/312
2013/0306665 A1 11/2013 Eberhardt et al.

OTHER PUBLICATIONS

English language PCT Written Opinon mailed Feb. 16, 2015, received in corresponding PCT Application No. PCT/EP14/71412, 6 pgs.
English language PCT International Preliminary Report on Patentability dated Sep. 9, 2015, received in corresponding PCT Application No. PCT/EP14/71412, 5 pgs.

\* cited by examiner

FILLING DEVICE FOR A MOTOR VEHICLE OPERATING FLUID CONTAINER

The invention relates to a filling device for a motor vehicle operating fluid container, the filling device comprising a mouth hole connection piece into which a dispensing valve can be introduced in order to fill the operating fluid container, a compensation chamber which is connected in fluid terms to the mouth hole connection piece and a connection piece which is arranged between the operating fluid container and the compensation chamber and which is connected in fluid terms to the operating fluid container and the compensation chamber.

The operating fluid container may be a fuel container, a urea container for use in an SCR method (selective catalytic reduction) or another motor vehicle operating fluid container.

When motor vehicle operating fluid containers are filled, for example, using a dispensing valve, operating fluid can be discharged via a filling device which is constructed as a filling connection piece. When a valve is switched off by means of a snifting hole/switch-off hole on the dispensing valve, the pressure surges which are produced in this instance lead to a fluid quantity which rises and falls back and which, depending on the configuration of the filling connection piece, can also sometimes spray outwards from the filling connection piece. In particular during filling with urea, this leads to non-desirable external contamination on the filling connection piece and on the vehicle.

In the event of so-called "spitback", as a result of the dispensing valve being switched off and the associated formation of waves in the filling connection piece, drops of operating fluid are thus sprayed from the filling connection piece through ventilation openings. In the event of so-called "splashback", as a result of the dispensing valve being switched off and/or as a result of the impact of the operating fluid which is being discharged from the dispensing valve on a fluid column during the filling operation, relatively large quantities of fluid are discharged from ventilation openings of the filling connection piece. Furthermore, in the event of so-called "blowout", droplets of fluid can be discharged from the operating fluid container during the filling operation from the filling head or from the filling connection piece when the ventilation flow which is being discharged from the ventilation openings strikes the operating fluid being discharged from the dispensing valve and carries it through the ventilation openings.

In order to reduce the quantity of operating fluid being discharged from the filling connection piece, it is known from the prior art to provide in the filling connection piece at least one compensation chamber which is connected in fluid terms both to the mouth hole connection piece and to the filling pipe. The surging movements which are brought about when the dispensing valve is switched off and/or switched on or waves of the operating fluid are reduced by the compensation chamber, the reduction or damping of the waves increasing with the volume of the compensation chamber.

On the one hand, the operating fluid being discharged from the operating fluid container when it is filled is intended to be reduced and, on the other hand, the size of the filling connection piece is intended to be reduced since the structural space available in the motor vehicle is limited. Thus, for instance, in the event of a motor vehicle which is operated with diesel, both the fuel filling connection piece and the urea filling connection piece are often arranged behind a common covering flap, whereby the structural space which is available is extremely limited.

WO 2012/139631 A1 describes a filler neck for a liquid tank for urea on motor vehicles, having a connection piece which is directly or indirectly connected to a component of the motor vehicle and/or to the liquid tank and having a removable sealing cover, wherein the connection piece has an axially running filler neck section which is designed both to receive, in a plunging manner, a nozzle for the urea and to hold, in attachable manner, a bottle filled with the urea. Inside the connection piece a filter element is arranged which face side is arranged towards the urea tank.

These two objectives described above have previously not been able to be combined with each other since the more compact the construction of the filling connection piece, the more operating fluid is discharged from the filling connection piece during the filling operation.

There is known from DE 10 2011 009 745 A1 a generic filling connection piece, in which a filling channel merges via an increase in diameter into the compensation chamber. A filling spout is arranged in the compensation chamber. A dispensing valve can be introduced through a mouth hole connection piece into the filling spout and consequently into the compensation chamber. When the operating fluid container is filled, the operating fluid flows from the dispensing valve through the compensation chamber into the filling channel in which, after a ventilation valve which is arranged in the operating fluid container has been closed, the operating fluid level increases. After the upper end of the filling channel has been reached, the operating fluid level also increases in the compensation chamber until the operating fluid reaches a switch-off opening/snifting opening of the dispensing valve which is located in the compensation chamber, whereby the filling operation is automatically ended. The action of the dispensing valve being switched off produces pressure surges which lead to a rising and falling fluid quantity. The wave energy which is produced in this manner is reduced in the compensation chamber.

The filling connection piece known from DE 10 2011 009 745 A1 already has good properties with regard to the discharge of operating fluid during the filling operation. In order to achieve this functionality, however, the filling connection piece is relatively large.

An object of the present invention is to provide an improved filling device which has a small discharge of operating fluid through the filling device during the filling operation and which has a small size, a reduced number of individual components, and to ensure consistent switching-off reliability which is independent of the position of the switch-off opening/snifting hole.

The object of the present invention is solved by a filling device having the features of claim 1. Advantageous embodiments are described in the dependent claims.

More specifically, the filling device according to the invention is distinguished in that a connection piece protrudes into the compensation chamber, the connection piece being arranged so as to face the mouth hole connection piece and to be spaced apart therefrom. In this instance, the connection piece is surrounded by the compensation chamber. A dispensing valve can be introduced through the mouth hole connection piece directly into the connection piece.

The compensation chamber, which can also be referred to as a surge chamber, as a relaxation space and/or as a compensation space, serves to absorb and reduce the wave energy of operating fluid located in the filling device. A wave movement of operating fluid located in the filling device can be brought about by the dispensing valve being switched off.

Furthermore, a wave movement of operating fluid located in the filling device can also be caused by fluid which is discharged from the dispensing valve striking a fluid surface inside the filling device. As a result of the provision of the compensation chamber, a reduced quantity of fluid is discharged from the filling device.

The connection piece is consequently surrounded by the compensation chamber and at least partially spaced apart from the compensation chamber wall in a radial direction. The connection piece is consequently located in the compensation space of the compensation chamber.

The inlet channel of the mouth hole connection piece opens in the compensation chamber. In this instance, the mouth hole connection piece and the connection piece face each other in such a manner that a dispensing valve can be introduced through the mouth hole connection piece into the connection piece.

When the operating fluid container is filled with an operating fluid via the filling device which can also be referred to as a filling connection piece, the operating fluid level in the filling pipe rises after a ventilation valve which is arranged in the operating fluid container has been closed. After the upper end of the filling pipe has been reached, the operating fluid level in the connection piece which is connected to the filling pipe increases until the operating fluid closes a switch-off opening in the dispensing valve. Since the connection piece protrudes into the compensation chamber and is surrounded by the compensation chamber, the operating fluid level inside the connection piece which is surrounded by the compensation chamber is always higher than the operating fluid level in the compensation chamber. Consequently, when the operating fluid chamber is filled, the compensation chamber is arranged downstream of the connection piece since the operating fluid when the operating fluid container is filled first rises in the connection piece, before it can reach the compensation space via the fluid connection to the compensation chamber.

Since the dispensing valve opens directly in the connection piece, when the operating fluid container is filled the operating fluid level within the connection piece rises rapidly so that the operating fluid reaches the switch-off opening of the dispensing valve before the operating fluid expands into the compensation chamber. As a result of the rapid increase of the operating fluid level within the connection piece during the filling operation, the dispensing valve switches off substantially independently of the positioning of the switch-off opening in the dispensing valve. Consequently, the filling device according to the invention can be used for different dispensing valves which have switch-off openings at different positions.

Furthermore, the internal tank pressure within the operating fluid container is reduced after the filling operation is automatically switched off in comparison with filling connection pieces known from the prior art since, before the automatic switching-off operation, the compensation chamber does not have to be flooded with the operating fluid so that a smaller operating fluid column applies pressure to the operating fluid in the operating fluid container. As a result of the smaller internal tank pressure, less operating fluid is also urged out of ventilation channels provided in the filling device so that the spitback and the splashback are reduced.

The filling device according to the invention does not require any separate filling spout so that the number of components of the filling device according to the invention is reduced. Consequently, the production costs for the filling device according to the invention and the complexity for the assembly thereof are reduced. Furthermore, the filling device according to the invention is very compact so that, for example, in the event of a motor vehicle which is operated with diesel, a diesel filling connection piece can be positioned beside a urea filling connection piece underneath a common covering flap.

The connection piece preferably has at least one discharge opening, by means of which the connection piece is connected in fluid terms to the compensation chamber. The sizing of the opening is such that, when the operating fluid container is filled, more fluid flows from the dispensing nozzle into the connection piece than flows through the discharge opening into the compensation chamber. It can thereby be ensured that the operating fluid level within the connection piece located in the compensation chamber is always higher than the operating fluid level in the compensation chamber.

Preferably in this instance, the discharge opening in the installation position of the filling device is arranged in the lower region of the connection piece which is located in the compensation chamber. It is thereby ensured that, after a filling operation, the operating fluid located in the compensation space or in the compensation chamber flows away into the connection piece and consequently into the operating fluid container.

The connection piece preferably has at least one material recess which extends in an axial direction over at least a partial length of the connection piece which is located in the compensation chamber. This material recess may also be referred to as a slot or a gap.

The material recess preferably extends substantially over the entire length of the connection piece which is located in the compensation chamber.

By means of the material recesses in the connection piece, improved overflow from the connection piece into the compensation chamber is achieved.

The dispensing valve can preferably be brought into direct contact with the connection piece.

The connection piece preferably tapers in the direction of the operating fluid container.

In the last two construction variants, the inclination of the filling connection piece for splashback and spitback is reduced again since less operating fluid can enter the intermediate space between the connection piece and the dispensing valve.

Other advantages, details and features of the invention will be appreciated below from the embodiments which are explained. In detail:

Figure 1:
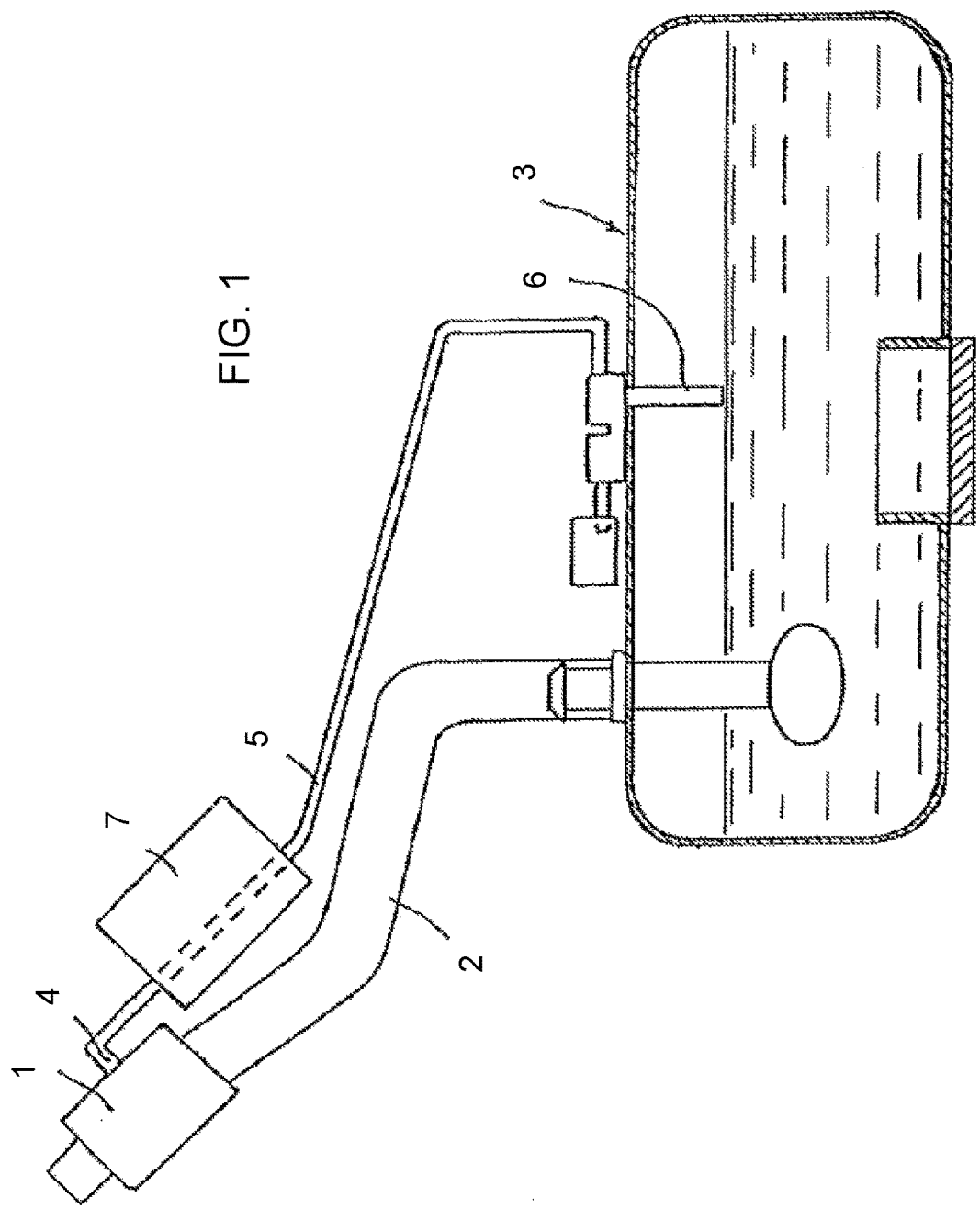
FIG. 1 is a cross-section through an operating fluid container with a filling device according to the invention.

In the description which now follows, reference numerals which are the same refer to components which are identical or features which are identical so that a description which is given with reference to a Figure in relation to a component also applies to the other Figures so that repetition of the description is prevented.

As can be seen in FIG. 1, the filling device 1 or the filling connection piece 1 according to the invention is arranged on a filling pipe 2 of an operating fluid container 3. In the embodiment described, this operating fluid container 3 is constructed as a urea container 3 for a fluid urea solution as a reduction agent for the catalytic exhaust gas denitrification in a motor vehicle.

The operating fluid container 3 may be constructed as an integral extrusion blow-moulded plastics container. The filling pipe 2 and the filling connection piece 1 may also comprise thermoplastic plastics material. The filling connection piece 1 and the remaining components described may also be produced with an injection-moulding method. In the embodiment described, the entire arrangement comprising the filling connection piece 1, filling pipe 2 and operating fluid container 3 is constructed in several pieces. The filling connection piece 1 is, as described below, constructed as a filling head having a connection 4 for a refuelling ventilation line 5. The refuelling ventilation line 5 opens via an immersion pipe 6 as a switching-off fitting in a predetermined ventilation position in the operating fluid container 3.

The refuelling ventilation line 5 is guided from the operating fluid container 3 to the filling connection piece 1 via a compensation container 7 which acts as a collection container for any fluid which occurs in the refuelling ventilation line 5. When the operating fluid container 3 is filled, a urea solution is directed into the operating fluid container 3 via a dispensing valve 40 (see FIG. 2) with the result that the fluid level rises therein and the gas present in the operating fluid container 3 is urged via the refuelling ventilation line 5 towards the filling connection piece 1 until the rising fluid level closes the immersion pipe 6. Then, the fluid level in the filling pipe 2 rises until it reaches a switch-off hole 41a, 41b, 41c at the dispensing valve 40 and closes it, with the result that a switching operation of the dispensing valve 40 is actuated. The refuelling operation is consequently ended.

Figure 2:
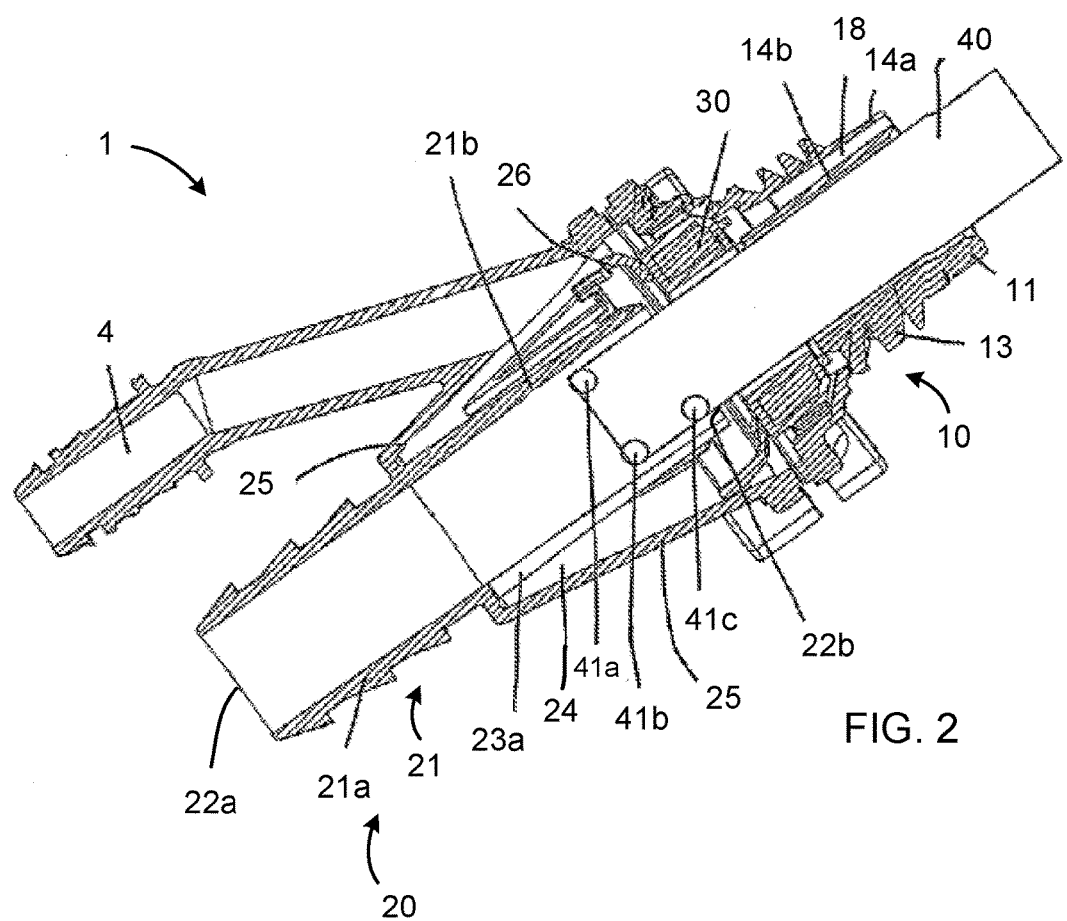
FIG. 2 is a lateral sectioned view of the filling device according to the invention with the dispensing valve inserted therein.
Figure 3:
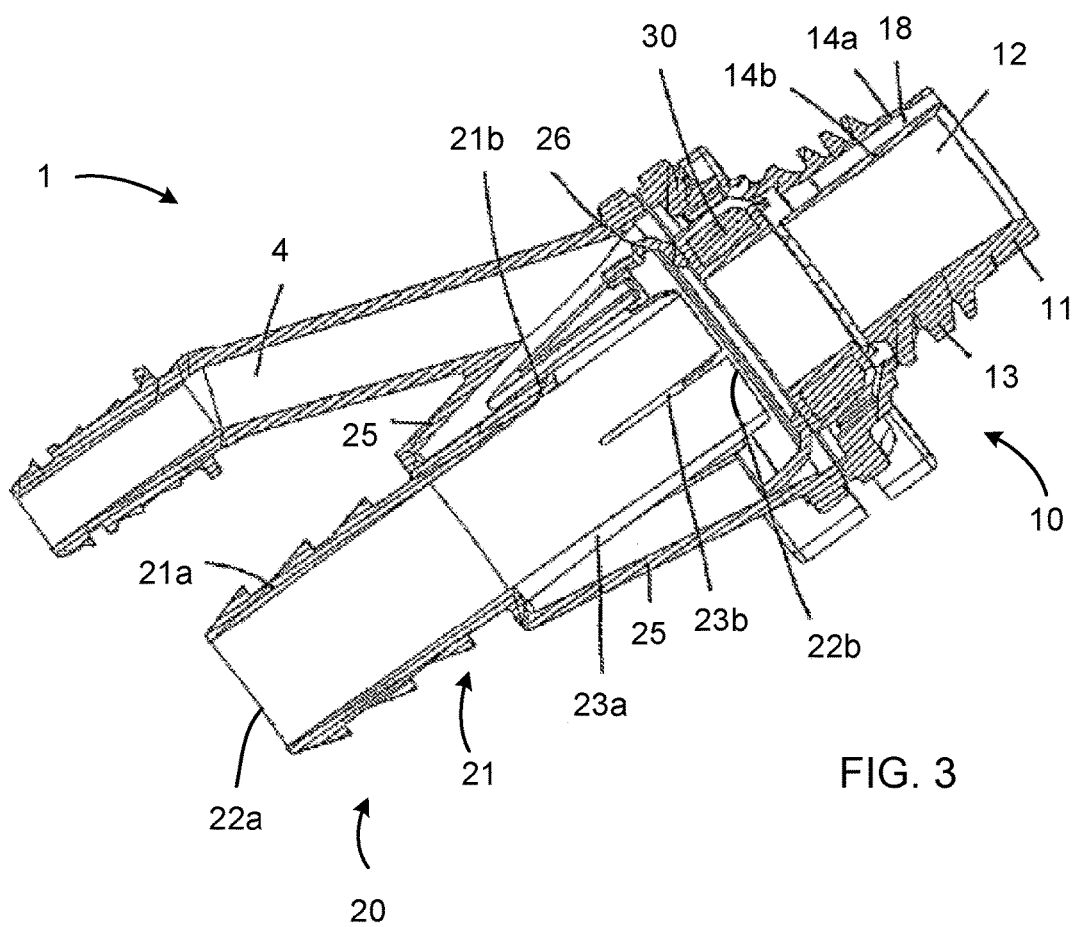
FIG. 3 shows the filling device illustrated in FIG. 2 without any dispensing valve inserted.

FIGS. 2 and 3 are lateral sectioned views of the filling device 1 according to the invention, a dispensing valve 40 being introduced into the filling connection piece 1 in FIG. 2, and the filling connection piece 1 being illustrated alone in FIG. 3 in lateral cross-section.

The filling connection piece 1 comprises an upper portion 10, in which a dispensing valve 40 can be introduced and a lower portion 20 which can be brought into fluid connection with the filling pipe 2. The upper portion 10 can be connected to the lower portion 20 by securing means.

The upper portion 10 comprises a mouth hole connection piece 11, in which there is provided at least one axially extending ventilation channel 18 which is surrounded by an outer wall 14 and an inner wall 14b which is radially spaced apart therefrom. The ventilation channel 18 serves to ventilate the operating fluid container 3 when the container 3 is filled with an operating fluid. When the operating fluid container 3 is filled, a ventilation gas flow which acts counter to the filling volume flow is produced in the ventilation channel 18.

There is provided on the outer side of the mouth hole connection piece a threaded collar 13, onto which a refilling container which is not illustrated in the Figures can be screwed in order to alternatively fill the operating fluid container 3 by means of the refilling container.

The lower portion 20 of the filling connection piece 1 comprises a connection piece 21 which can be brought into fluid connection with the filling channel 2, a compensation chamber 24 and a connection 4 for the refuelling ventilation line 5. The connection 4 opens in the compensation chamber 24 so that the refuelling ventilation line 5 is connected in fluid terms to the compensation chamber 24.

In FIGS. 2 and 3, it can be seen that the connection piece 21 has in the lower region 21a, a lower end 22a facing the filling pipe 2. As shown, lower region 21a includes a fir-tree-like profile so that the filling pipe 2 can be pushed onto the corresponding portion of the connection piece 21. However, it is also readily possible for the filling connection piece 1 to have in the region facing the filling pipe 2 a connection flange which is not illustrated in the Figures and which can be connected to a connection flange of the filling pipe 2, which flange is also not illustrated in the Figures. It is further also readily possible for the filling pipe to be welded to the filling connection piece 1.

In the drawings, it can be seen that an upper region 21b of the filling connection piece 21 protrudes into the compensation chamber 24. The upper region 21b of the connection piece 21 has an upper end 22b which faces the mouth hole connection piece 11 and is arranged so as to be spaced apart therefrom. Consequently, the upper region 21b of the connection piece 21 is surrounded by the compensation chamber 24, the connection piece 21 being radially spaced apart from a compensation chamber wall 25 which delimits the compensation chamber 24.

The mouth hole connection piece 11 is connected in fluid terms to the compensation chamber 24 and the connection piece 21 is arranged between the operating fluid container 3 and the compensation chamber 24 and connected in fluid terms both to the operating fluid container 3 and the compensation chamber 24. The dispensing valve 40 can be introduced into the mouth hole connection piece through a mouth hole opening 12 of the mouth hole connection piece 11. Since the mouth hole connection piece 11 is arranged facing the connection piece 21, the dispensing valve 40 can be introduced directly into the connection piece 21 so that, in order to close a switch-off opening 41a, 41b, 41c by the operating fluid, the compensation chamber 24 does not have to be filled with the operating fluid beforehand.

As a result of the rapid rise of the operating fluid level in the connection piece 21 during the refuelling operation, the positioning of the switch-off opening or snifting opening 41a, 41b, 41c is unproblematic. In FIG. 2, it can be seen that different positionings for the switch-off opening are possible and that with all three switch-off openings 41a, 41b, 41c which are illustrated the automatic switch-off action in the filling connection piece 1 according to the invention functions in a problem-free manner since, during the refuelling operation, the operating fluid level reaches each location of the dispensing valve 40 in which a switch-off opening 41a, 41b, 41c can be provided at substantially the same time.

It can be seen in FIG. 3 that there is provided in the connection piece 21 a material recess 23b which extends in an axial direction over at least a partial length of the connection piece 21 which is located in the compensation chamber 24. Furthermore, the connection piece 21 comprises an additional material recess 23a, which extends substantially over the entire longitudinal extent of the connection piece 21.

By means of these slots 23a, 23b, the connection piece 21 is in fluid connection with the compensation chamber 24 so that operating fluid which is located in the connection piece 21 can be discharged via the slots 23a, 23b into the compensation chamber 24. It is thus possible, for example, after a refuelling operation is complete, for the operating fluid which is located in the compensation chamber 24 to flow through the material recess 23a completely into the connection piece 21 and thereby to flow back into the operating fluid container 3.

In the Figures, it can further be seen that, in a free space of the upper portion 10 of the filling connection piece 1, there is inserted an annular magnet 30 which in the installation position of the filling connection piece 1 is retained by means of a retention plate 26 of the lower portion 20 of the filling connection piece 1. The dispensing valve 40 can be guided in this instance through the annular space of the annular magnet 30 and can be switched by means of the annular magnet 30.

LIST OF REFERENCE NUMERALS

1 Filling device/filling connection piece
2 Filling pipe
3 Operating fluid container
4 Connection for refuelling ventilation line
5 Refuelling ventilation line
6 Immersion pipe
7 Compensation container
10 Upper portion of the filling connection piece
11 Mouth hole connection piece
12 Mouth hole opening/mouth hole
13 Threaded collar
14a Outer wall (of the wall)
14b Inner wall (of the wall)
18 Ventilation channel
20 Lower portion of the filling connection piece
21 Connection piece
23a, 23b Material recess/discharge opening/overflow opening
24 Compensation chamber
25 Compensation chamber wall
26 Retention plate (for annular magnet)
30 Annular magnet
40 Dispensing valve
41a, 41b, 41c Switch-off opening/snifting opening

What is claimed is:

1. A filling device for an operating fluid container for a motor vehicle, comprising:
    a mouth hole connection piece into which a dispensing valve is introducible to fill the operating fluid container,
    a compensation chamber in fluid communication with the mouth hole connection piece; and
    a connection piece arranged between the operating fluid container and the compensation chamber, the connection piece in fluid communication with the operating fluid container and the compensation chamber,
    wherein the connection piece has an upper portion and a lower portion;
    wherein the upper portion of the connection piece protrudes into the compensation chamber towards the mouth hole connection piece;
    wherein the upper portion of the connection piece is arranged spaced apart from the mouth hole connection piece and such that the dispensing valve is introducible through the mouth hole connection piece into the connection piece;
    wherein the upper portion of the connection piece is surrounded by the compensation chamber and arranged therewith such that, when an operating fluid in the operating fluid container overflows and rises into the filling device, the operating fluid level fills the connection piece before flowing downstream to the compensation chamber.

2. The filling device according to claim 1, wherein the connection piece has at least one discharge opening to provide fluid communication to the compensation chamber.

3. The filling device according to claim 2, wherein the discharge opening is located in the compensation chamber.

4. The filling device according to claim 1, wherein the connection piece has at least one material recess which extends in an axial direction of the connection piece over at least a partial length of the connection piece located in the compensation chamber.

5. The filling device according to claim 4, wherein the material recess extends substantially over the entire length of the connection piece located in the compensation chamber.

6. The filling device according to claim 1, wherein the connection piece is arranged such that the dispensing valve is movable into direct contact with the connection piece.

7. The filling device according to claim 1, wherein the connection piece tapers in a direction of the operating fluid container.

* * * * *